July 13, 1926. Re. 16,381

F. HAMMOND

LIQUID MEASURING AND DISPENSING APPARATUS

Original Filed Jan. 15, 1921 2 Sheets-Sheet 1

Inventor
Frank Hammond
By his Attorneys
Dean, Fairbank, Albright & Hirsch

July 13, 1926. Re. 16,381

F. HAMMOND

LIQUID MEASURING AND DISPENSING APPARATUS

Original Filed Jan. 15, 1921 2 Sheets-Sheet 2

Inventor
Frank Hammond
By his Attorneys
Dean, Fairbank, Wright & Hirsch

Reissued July 13, 1926. Re. 16,381

UNITED STATES PATENT OFFICE.

FRANK HAMMOND, OF LONDON, ENGLAND.

LIQUID MEASURING AND DISPENSING APPARATUS.

Original No. 1,445,212, dated February 13, 1923, Serial No. 437,421, filed January 15, 1921, and in Great Britain December 15, 1919. Application for reissue filed February 10, 1925. Serial No. 8,242.

This invention has reference to liquid measuring and dispensing apparatus and has been devised with the object of effectively locking and unlocking the inlet and outlet pipes as required, ensuring accurate measurement and delivery of the volume of liquid measured, and preventing accidental withdrawal of liquid from the measuring bowl.

The invention consists in means whereby the handles controlling the inlet and outlet pipes are so coupled that when the former is open the latter is closed and vice versa. This may be effected by means of toothed quadrants in such a manner that the liquid may pass into the measuring bowl and the volume measured before discharge of the liquid therefrom.

In cases where the measuring means comprises a tube adjustable as to height in the bowl, which tube is adapted to be raised or lowered by a handle or handles capable of being locked in horizontal slots branching from a vertical slot or slots in a sleeve, it has been found that there is a possibility of the handle or handles dropping down the vertical slots when at the neutral or midway position with possible escape back to the storage tank of the liquid in the measuring bowl. To obviate this I provide an inner locking sleeve having a vertical slot (or opposed vertical slots) which is or are provided with horizontal slots on one side only so that when the handle is brought to the neutral position the inner locking sleeve prevents it dropping or rising from its set position.

The controlled inlet pipe or passage from the storage tank is brought inside or adjacent the measuring bowl and is formed with an inverted U bend having a discharge opening at the bottom of the bowl, and in order to prevent a siphonage of the liquid back to the tank I make an air vent at the top of the bend.

A disc, preferably concave is provided on the end of the adjustable tube to avoid formation of a meniscus on the surface of the liquid and I may secure vertical radial fins thereon whereby any swirling of the liquid is more rapidly checked.

I will now refer to the two sheets of drawings herewith in order that the invention may be more readily comprehended.

Figure 7:
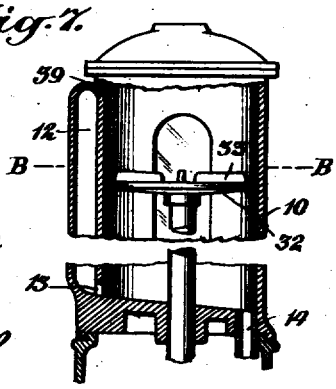
Figure 7 is a partial sectional elevation of the measuring chamber.

Fig. 7[a] is a detail illustration of the measuring chamber, showing the inverted U-inlet 12.

Figure 8:
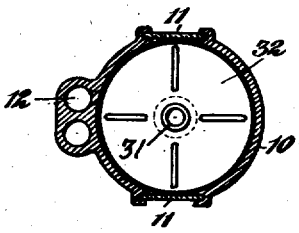

Figure 8 is a section on line B—B Figure 7.

Figure 9:
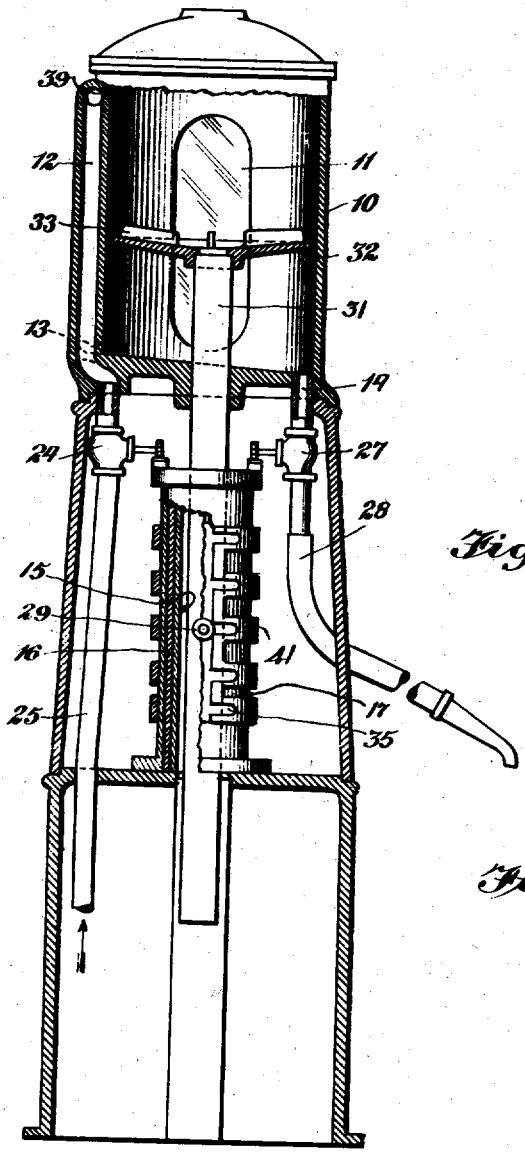
Figure 7A:
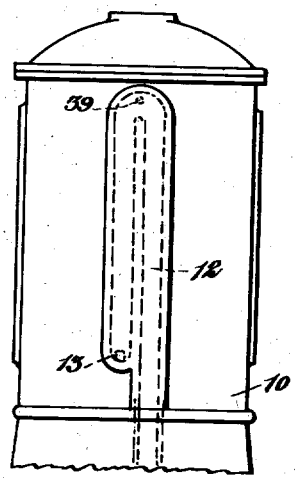

Figure 9 is an elevation partly in section of an apparatus provided with my improvements.

Figure 10:
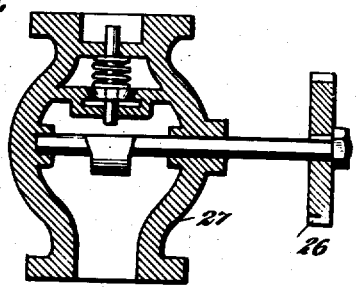

Fig. 10 is a detail sectional view of one of the valves.

Figure 11:
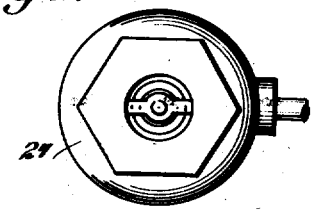

Fig. 11 is a detail top plan view of the same.

The same numerals indicate the same or corresponding parts.

10 is the measuring chamber provided with two or more transparent view portions or insets 11 graduated according to the capacity measures desired. 12 is an inverted U inlet pipe in communication with a pump or gravity supply tank containing the liquid and delivering through a passage 13 adjacent the bottom of the chamber which is preferably inclined towards the discharge outlet 14. 15 represents the operating sleeve, 16 the locking sleeve and 17 the outermost or graduated sleeve marked with capacity indications corresponding to those viewed through or on the transparent portions 11.

The operating sleeve 15 has secured thereto the circular plate 20 on which are oppositely positioned the quadrant racks 21 and 22 the former of which is in engagement with the pinion 23 controlling the valve 24 on the supply pipe 25 in communication with the pipe 12, while the rack 22 is in engagement with the pinion 26 controlling the delivery valve 27 on the discharge pipe 28 in communication with the outlet 14. The valves 24, 27 are alike in construction, and hence I only show one of them in detail in Figs. 10 and 11.

The operating handles 29 and 30 are secured on the vertically slidable overflow tube 31 on which, within the chamber, is the disc 32 preferably concave and having on its upper face the radial fins or baffles 33.

On the graduated sleeve 17 is the vertical slot 34 from which branch on each side the horizontal slots 35. The graduated sleeve may also have or include a skeleton reinforcing jacket including rings 41 with the graduating slots therein. On the locking sleeve 16 is the vertical slot 36 from which branch from one side thereof the horizontal slots 37. The operating sleeve 15 has the vertical slot 38. The opposite side of the apparatus is similarly slotted except that the horizontal slots in the sleeve 16 extend in the same circumferential direction from each vertical slot 36. Adjacent the bend of the pipe 12 is an air hole 39 in communication with the top of the chamber, to prevent an air lock.

Figure 1:
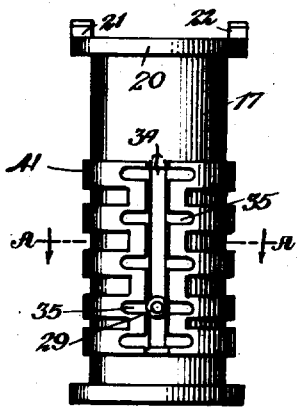
Figure 1 is an elevation of the operating and locking and graduated sleeves.
Figure 2:
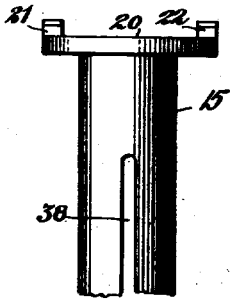
Figure 2 is a part elevation of the operating sleeve.
Figure 3:
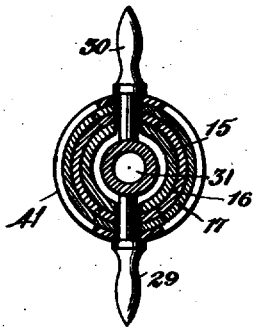
Figure 3 is a section on line A—A Figure 1.
Figure 4:
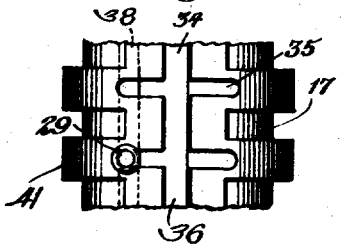
Figures 4 and 5 are part elevations showing the operating handle in the locked and discharge positions respectively.
Figure 5:
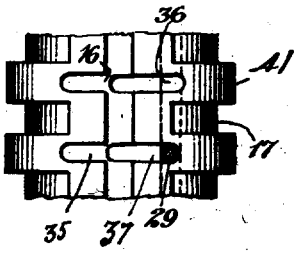
Figure 6:
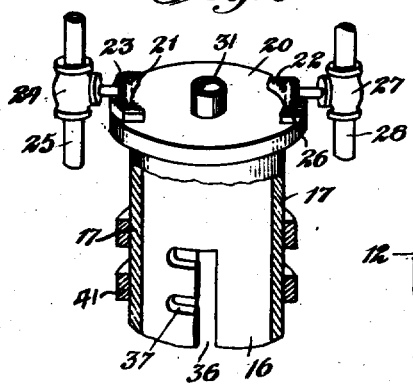
Fig. 6 is a perspective view of the assembled sleeves, the graduating sleeve being broken away to show the locking sleeve.

The operation of the apparatus is as follows: The handles 29 and 30 are raised in the vertical slots 34, 36, and 38 on opposite sides to the required height as indicated on the graduated sleeve 17 and are then turned into the horizontal slots 35 on the right. This movement carries the operating sleeve 15 round and consequently the plate 20 and racks 21 and 22. These racks rotate the pinions 23 and 26, thereby simultaneously opening the supply valve 24 and closing the delivery valve 27. The handles also carry the locking sleeve 16 across with it, thereby locking them as shown in Figure 5. The vertical slot 36 is now out of registry with the slot 34. When the liquid rises in the chamber to the predetermined height, each handle is carried across to the discharge side as shown in Figure 4 thereby closing the valve 24 and opening the discharge valve 27 whereupon the liquid flows through the the opening 14 and delivery pipe to the nozzle 28. During this movement, the handle first moves along the slot 37 to the ends thereof, but when at the slot 34 it cannot be raised or lowered. The further movement of the handle into the left slots 35 rotates the sleeve 16 to bring the slot 36 into registry with the slot 34. The sleeve 16 thus acts to lock and unlock the handle. The handle cannot be raised or lowered after moving to filling position and before being moved to emptying position. When the liquid has been delivered and the chamber 10 is empty, the handles are returned to the neutral position, the sleeves 15 and 16 with their vertical slots 38 and 36 respectively being then in alignment with the vertical slot 34 in the graduated sleeve.

It is obvious that instead of two oppositely positioned handles the apparatus may be operated by one; but two handles, each capable of being moved in corresponding slots, ensure certainty and balance of movement.

Having thus described my invention, what I claim as new and desire to protect by Letters Patent is:—

1. In a liquid measuring and dispensing apparatus, the combination of a measuring chamber, a supply duct leading thereto, a discharge duct leading therefrom, valves in said ducts, a slidable vertically disposed overflow tube having an operating handle, and a plurality of concentric sleeves encircling said overflow tube, one of said sleeves serving as an operating member for said valves, another of said sleeves serving as a graduating sleeve to control positionings of said handle for different measured quantities in said chamber, and another of said sleeves serving as a locking member to prevent vertical adjustment of said tube after opening of the valve of the supply duct, and before opening the valve of said discharge duct.

2. In a liquid measuring and dispensing apparatus as claimed in claim 1, the concentric sleeves each provided with a vertical slot, the locking sleeve having branch horizontal slots on one side of its vertical slot, and the graduated sleeve having horizontal slots on both sides of its vertical slot said operating handle extending through said slots.

3. In liquid measuring and dispensing apparatus, a vertically slidable overflow tube carrying a disc within the measuring chamber, said disc having two or more radial fins or baffles on its upper surface for the purpose of checking any swirling of the liquid above the disk.

4. In a liquid measuring and dispensing apparatus the combination of a measuring chamber, supply and discharge pipes connected thereto, valves in said pipes, a vertically slidable overflow tube having an operating handle and juxtaposed operating, locking, and graduating members, said operating member having means for controlling said valves, said graduating member having means for retaining said operating handle at definite and predetermined elevations, and said locking member having means for preventing vertical movement of said handle after closing of the valve of the supply pipe, and before opening of the valve of the discharge pipe.

5. A liquid measuring and dispensing apparatus having a measuring chamber, supply and discharge pipes leading thereto, valves in said pipes, a vertically slidable overflow tube having an operating handle, three juxtaposed members each provided with a vertical slot through which said handle extends, one member being laterally movable to operate said valves upon lateral movement of the handle, another of said members being held against lateral movement and having laterally extending slots upon opposite sides thereof, and the other of said members being laterally movable and having laterally extending slots upon one side only of the vertical slot.

6. A liquid measuring and dispensing apparatus having a measuring chamber, supply and discharge pipes leading thereto, valves in said pipes, a vertically slidable overflow tube having an operating handle, two juxtaposed members each having a vertical slot through which said handle extends, one of said members being laterally movable to operate said valves upon the lateral movement of the handle, and the other of said members being held against lateral movement and having a set of lateral slots upon one side for receiving the handle during the operation of the supply valve, and a second set of lateral slots upon the other side to receive the handle during the operation of the discharge valve, and means for preventing vertical movement of the handle in said vertical slots after movement out of one of said first mentioned set of slots, and until after movement into and out of one of said second mentioned set of slots.

7. A liquid measuring and dispensing apparatus having a measuring chamber, supply and discharge pipes leading thereto, valves in said pipes, a vertically slidable overflow tube having an operating handle, two juxtaposed members each having a vertical slot through which said handle extends, one of said members being laterally movable to operate said valves upon the lateral movement of the handle, and the other of said members being held against lateral movement and having a set of lateral slots upon one side for receiving the handle during the operation of the supply valve, and a second set of lateral slots upon the other side to receive the handle during the operation of the discharge valve, and means for preventing vertical movement of said tube after closing the supply valve, and before opening the discharge valve.

8. A liquid measuring and dispensing apparatus having a measuring chamber, supply and discharge pipes leading thereto, valves in said pipes, a vertically slidable overflow tube having an operating handle, two juxtaposed members each having a vertical slot through which said handle extends, one of said members being laterally movable to operate said valves upon the lateral movement of the handle, and the other of said members being held against lateral movement and having a set of lateral slots upon one side for receiving the handle during the operation of the supply valve, and a second set of lateral slots upon the other side to receive the handle during the operation of the discharge valve, and a laterally movable locking member having a vertical slot and lateral slots upon one side only thereof for preventing vertical movement of the overflow tube after closing the supply pipe and before opening the discharge pipe.

9. A liquid measuring and dispensing apparatus having a measuring chamber, supply and discharge pipes leading thereto, valves in said pipes, a vertically slidable overflow tube having an operating handle, connections between said handle and said valves for opening the valve of the supply pipe upon movement of the handle in one direction from a mean position and opening the valve of the discharge pipe upon movement of said handle in the opposite direction from said mean position, means for supporting said handle and tube in predetermined positions corresponding to predetermined volumes in said chamber determined by the elevation of said overflow tube, and locking means for preventing vertical movement of the tube and handle after movement of the handle in one direction to open the valve of the supply pipe and before movement of the handle in the opposite direction to open the valve of the discharge pipe.

Signed at London, England, this 28th day of January, 1925.

FRANK HAMMOND.